United States Patent
Julian et al.

(10) Patent No.: US 9,021,940 B2
(45) Date of Patent: May 5, 2015

(54) VACUUM FRYING DEVICE AND METHOD FOR USING THE SAME

(75) Inventors: John C. Julian, Richland, WA (US); Jerome James Glantz, Richland, WA (US); Jeffrey Schneider, Benton City, WA (US); Jeffery J. DeLapp, Eagle, ID (US)

(73) Assignee: ConAgra Foods Lamb Weston, Inc.

( * ) Notice: Subject to any disclaimer, the term of this patent is extended or adjusted under 35 U.S.C. 154(b) by 1015 days.

(21) Appl. No.: 12/828,100

(22) Filed: Jun. 30, 2010

(65) Prior Publication Data

US 2011/0005403 A1    Jan. 13, 2011

Related U.S. Application Data

(60) Provisional application No. 61/224,812, filed on Jul. 10, 2009.

(51) Int. Cl.
*A47J 37/12* (2006.01)
*A47J 27/04* (2006.01)

(52) U.S. Cl.
CPC ............... *A47J 27/04* (2013.01); *A47J 37/1219* (2013.01); *A47J 37/1271* (2013.01); *A47J 37/128* (2013.01)

(58) Field of Classification Search
CPC ..... A47J 27/04; A47J 37/128; A47J 37/1271; A47J 37/1219
USPC ........... 99/403–404, 407, 409, 472, 416, 330, 99/336; 426/231–233, 520–523, 509–511
See application file for complete search history.

(56) References Cited

U.S. PATENT DOCUMENTS

| 3,314,416 | A |   | 4/1967 | Wagner |
| 4,732,081 | A |   | 3/1988 | Sakuma |
| 5,125,328 | A |   | 6/1992 | Grandi |
| 5,185,168 | A |   | 2/1993 | Takahashi |
| 5,301,604 | A |   | 4/1994 | Takahashi |
| 5,402,712 | A | * | 4/1995 | King et al. ...................... 99/407 |
| 5,676,042 | A |   | 10/1997 | Sakuma et al. |
| 5,782,170 | A | * | 7/1998 | Pomara, Jr. .................... 99/407 |
| 2004/0163547 | A1 |   | 8/2004 | Kijimoto |
| 2006/0283335 | A1 |   | 12/2006 | Vasquez |
| 2010/0037782 | A1 | * | 2/2010 | Foster et al. ................... 99/337 |

FOREIGN PATENT DOCUMENTS

| EP | 1649794 A2 | 4/2006 |
| FR | 1526864 | 5/1968 |
| WO | WO2006/100385 A1 | 9/2006 |

OTHER PUBLICATIONS

International Search Report from PCT Application No. PCT/US2010/041588 dated Sep. 21, 2010.
Written Opinion of the International Searching Authority from PCT Application No. PCT/US2010/041588 dated Sep. 21, 2010.
Henny Penny Brochure, Pressure fryers, Model PFE-500 Electric, dated Nov. 11, 2009. (2 pages).

* cited by examiner

*Primary Examiner* — Henry Yuen
*Assistant Examiner* — Phuong Nguyen
(74) *Attorney, Agent, or Firm* — Ryan T. Grace; Advent, LLP

(57) ABSTRACT

A method of converting a conventional atmospheric frying device to a vacuum frying device is provided. The method includes positioning a hood on top of a conventional frying device to provide an enclosure for drawing a vacuum within the modified devices. In addition, the method can include strengthening the existing vat so that it is capable of withstanding the forces associated with vacuum frying.

11 Claims, 7 Drawing Sheets

VACUUM FRYING DEVICE AND METHOD FOR USING THE SAME

CROSS-REFERENCE TO RELATED APPLICATION

This application claims the benefit of U.S. Provisional Application No. 61/224,812, filed on Jul. 10, 2009, and is incorporated herein by reference in its entirety.

FIELD

The disclosure of the application is directed to vacuum frying devices and methods for using the same.

BACKGROUND

Many restaurants and other locations where food articles are "cooked to order" utilize frying devices for cooking various food articles, such as French fries. For example, in most restaurants, French fries are cooked after receiving an order from a customer or, in some cases, just prior to receiving an order from a customer. Such conventional frying devices usually have an "open pot" configuration, where a container (e.g., a vat) of oil is open at the top so that a cook can place a basket containing food articles into the oil to fry the food articles. Once the food articles are fried for a desired length of time, the cook can remove the basket of food articles from the oil and prepare the cooked food articles to be served to an ordering customer.

The high heat required to fry food articles using conventional open pot fryers, however, has several disadvantages. First, high cooking temperatures can cause the frying oil to chemically break down and cloud up, thereby reducing the length of time and fry cycles that the oil can be used to cook food articles. As a result, the amount of product that can be cooked with a quantity of oil is reduced. Furthermore, high temperature cooking of oils can also diminish the possibility that the used oil can be recycled for other uses, such as for biodiesel fuel.

High cooking temperatures can also cause food articles to undesirably darken due to the Maillard reaction, which involves reducing sugars and amino acids. In addition, because an open pot fryer is open at the top, the cook is exposed to potentially dangerous high temperature oils. Accordingly, it is desirable to provide a system that produces a more desirable fried product and which reduces the risk of potential danger to the cook.

Vacuum conditions can permit the frying process to be performed at lower oil temperatures. As a result, oil used in vacuum frying systems generally lasts longer than oil used at atmospheric frying. Various vacuum frying systems have been used to fry commercial food articles at manufacturing plants. Such conventional vacuum frying devices, however, are generally configured to vacuum fry a large quantity of food articles for packaging and shipment to other locations for distribution and sale. As a result, such systems are not conducive for use in a restaurant, where various food articles are cooked to order.

Accordingly, there is a need for a vacuum frying device that is configured for vacuum frying food articles for relatively immediate consumption by an ordering customer.

SUMMARY

In one embodiment, a frying device includes a hood defining a basket receiving area and having an opening, an oil receiving area located below the basket receiving area, a door configured to be movable between a first position not covering the opening in the hood and a second position covering the opening in the hood, a basket carrying device, a mechanism for moving the basket carrying device from the basket receiving area to the oil receiving area, and a vacuum device configured to reduce the air pressure in the basket receiving area.

In specific implementations, the hood includes a vacuum connection portion. The vacuum connection portion can be configured to receive a tube connected to the vacuum device so that the tube is in fluid connection with the basket receiving area. The vacuum connection portion can be a second opening in the hood.

In other specific implementations, the mechanism for moving the basket carrying device can include two sprockets attached to a rod and two chains coupled to the sprockets. In addition, the mechanism can include a lever located on an external surface of the frying device, with the lever being configured to rotate the two sprockets.

In other specific implementations, the hood can be removed to convert the frying device from a vacuum frying device into an atmospheric frying device. The oil receiving area can be defined by a metal container that is capable of withstanding a vacuum of at least 28 inches of Hg.

In another embodiment, a method for converting an atmospheric frying device to a vacuum frying device is provided. The method includes providing a frying device configured for atmospheric frying of food articles. The frying device includes a vat defining an oil receiving area. The method also includes providing a hood with front and bottom sides. The hood has an opening in the front side and an opening in the bottom side and includes a door that is movable between a first position where the door does not cover the opening in the front of the hood and a second position where the door covers the opening in the front of the hood. The method also includes placing the hood on a top surface of the frying device so that the opening in the bottom side faces the oil receiving area. The method can also include providing a vacuum device and coupling the vacuum device to the hood.

In specific implementations, the method can also include strengthening the vat so that it can withstand a vacuum of at least 28 inches of Hg. The act of strengthening the vat can include reinforcing the vat with additional materials or it can include replacing the vat with a different vat.

In other specific implementations, the method can include providing a seal between the hood and the top surface of the frying device, and providing a seal between the door and a surface of the hood that is contacted by the door when the door is in the second position.

In another embodiment, a system for converting an atmospheric frying device to a vacuum frying device is provided. The system can include a hood with front and bottom sides, and a vacuum device. The hood can have an opening in the front side and an opening in the bottom side, and a door that is movable between a first position where the door does not cover the opening in the front of the hood and a second position where the door covers the opening in the front of the hood. The vacuum device can be configured to be coupled to the hood.

In specific implementations, the hood can be configured to be received on a top surface of the atmospheric frying device with the opening on the bottom facing an oil receiving area of the atmosphere frying device. A seal can be positioned on the bottom side of the hood.

The system can also include a vat configured to withstand a vacuum of at least 28 inches of Hg, and the vat can be configured to replace an existing vat on the atmospheric frying device. Alternatively, or in addition, the system can include a strengthening member configured to strengthen an existing vat on the atmospheric frying device so that the strengthened vat can withstand a vacuum of at least 28 inches of Hg.

The foregoing and other objects, features, and advantages of the embodiments disclosed herein will become more apparent from the following detailed description, which proceeds with reference to the accompanying figures.

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Figure 1:
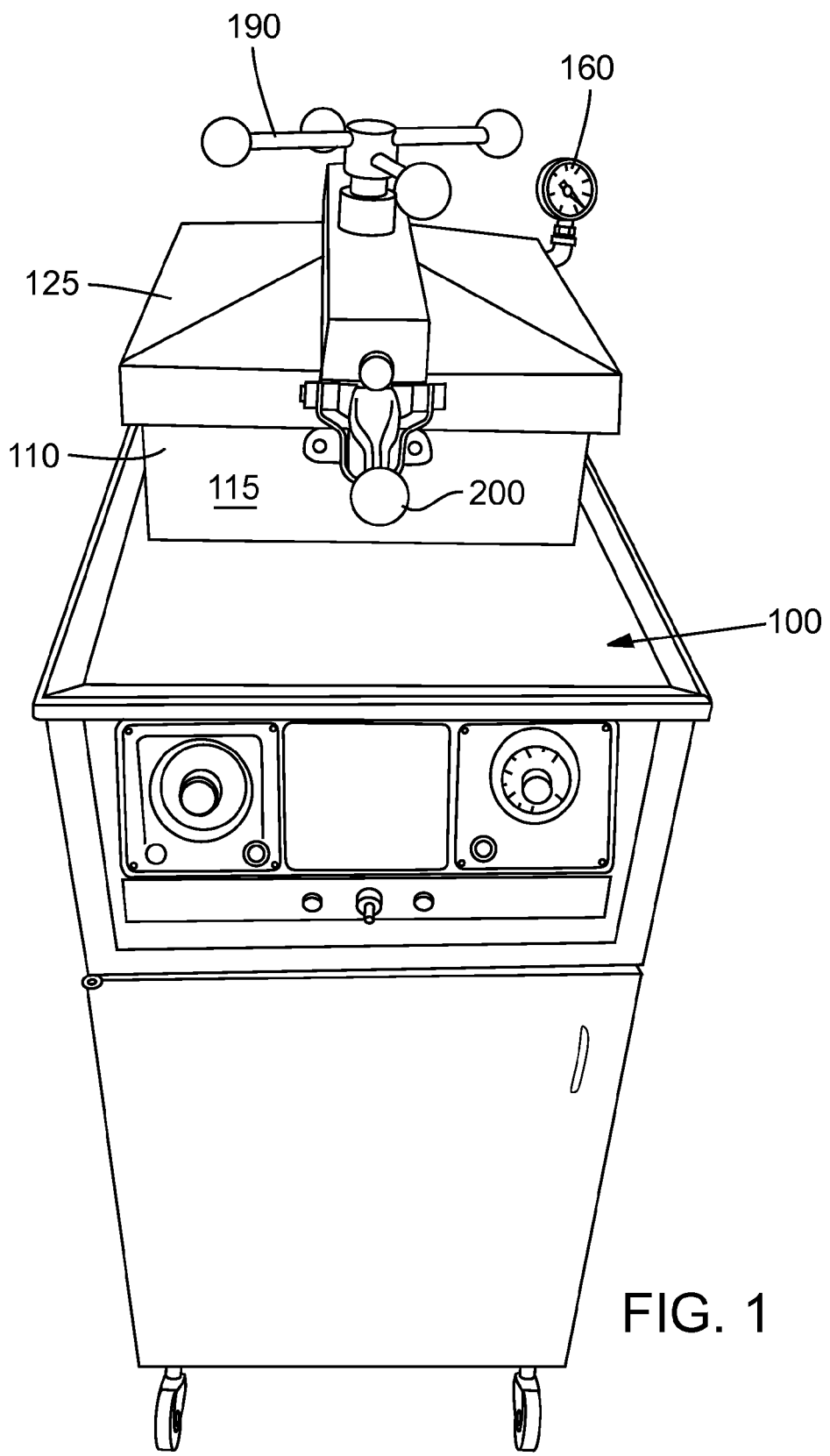
FIG. 1 shows a top perspective view of a vacuum frying device.

In a first embodiment, a vacuum frying device and a method of modifying a pressure fryer for use as a vacuum frying device is disclosed. FIG. 1 shows a top perspective view of a vacuum frying device 100. Vacuum frying device 100 comprises a pressure frying device (namely, a Henny Penny® Pressure Fryer 500), that was modified for use as a vacuum frying device.

Figure 2:
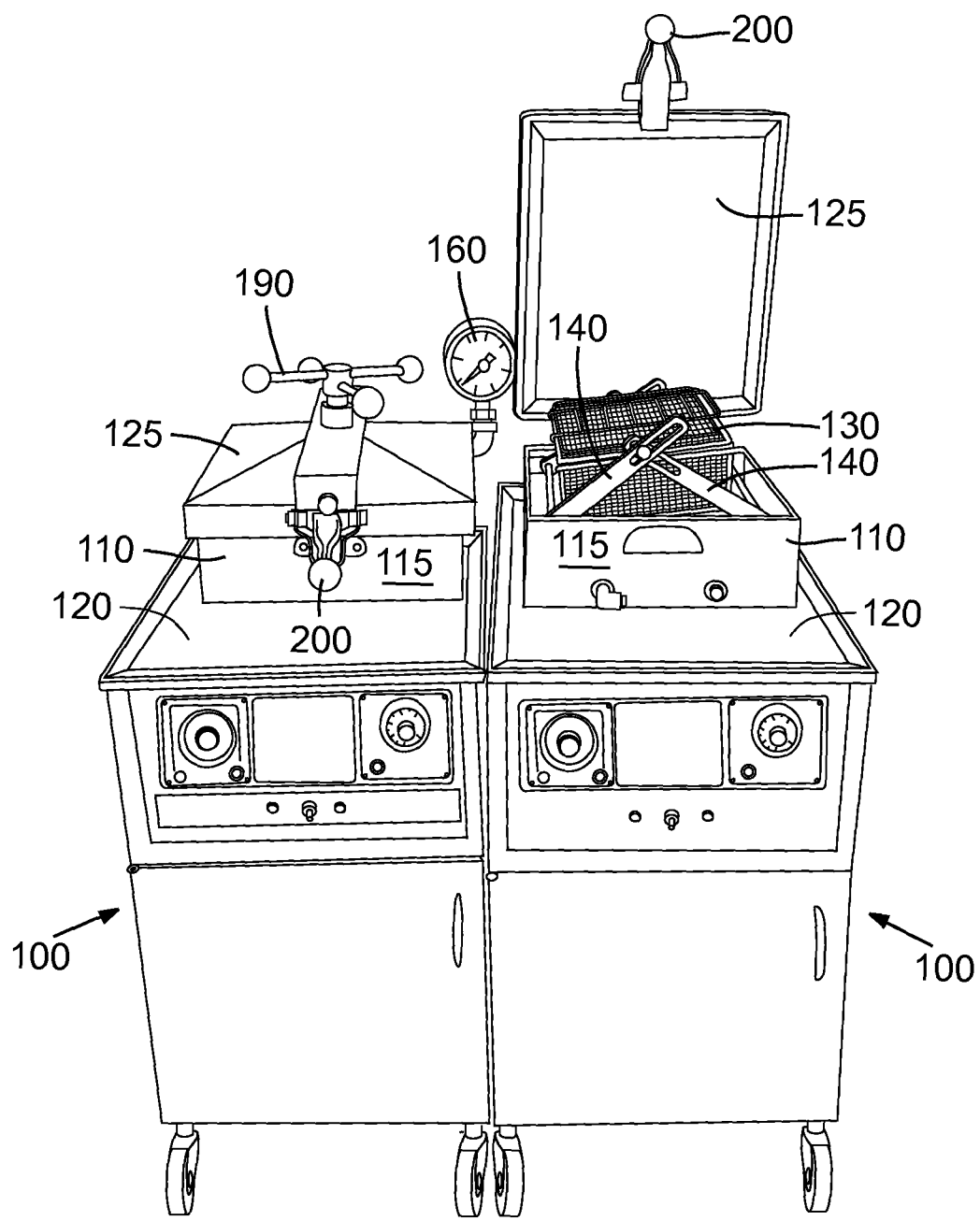
FIG. 2 shows a top perspective view of two vacuum frying devices positioned side by side, with the vacuum frying device on the right shown with an open cover.
Figure 3:
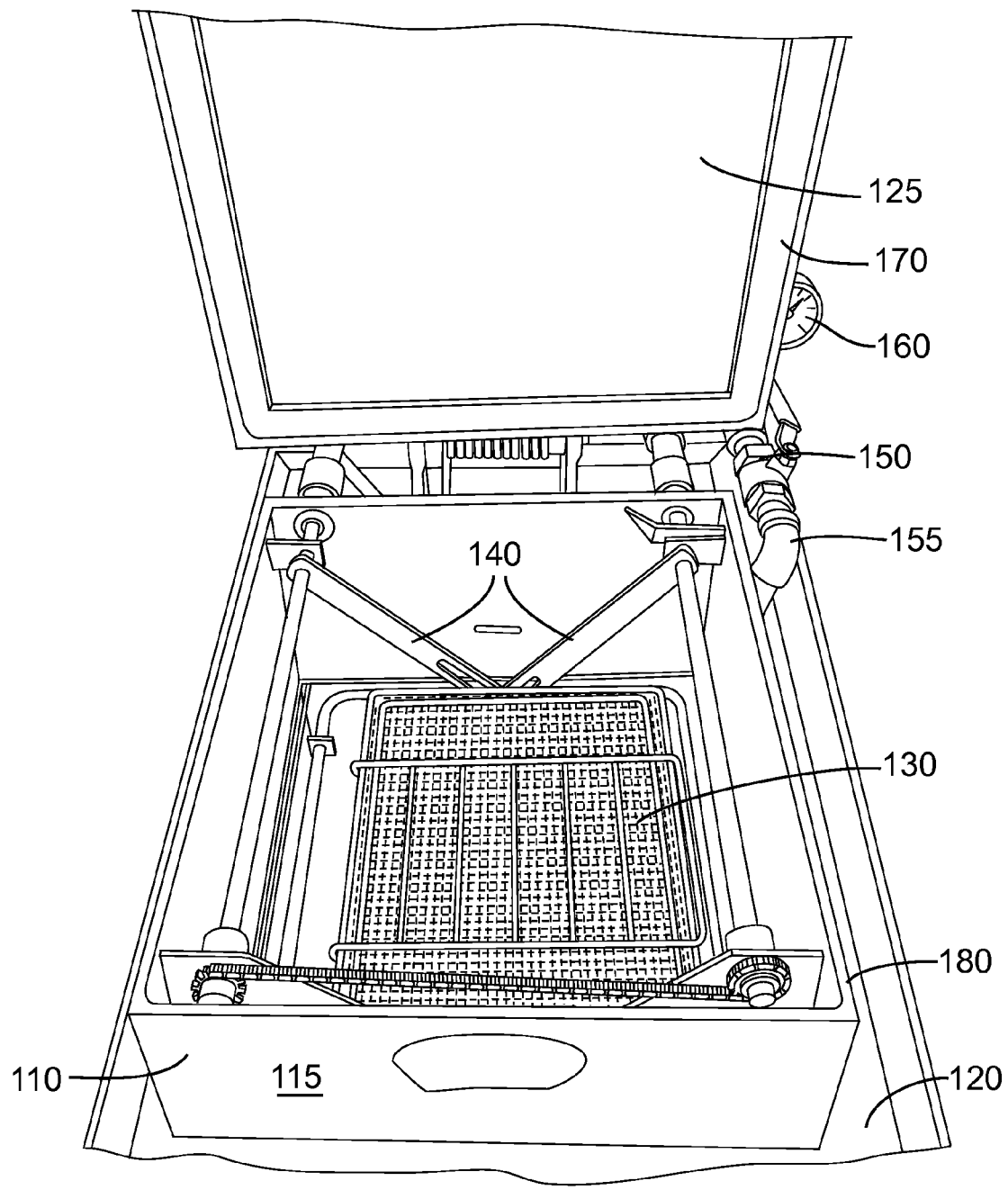
FIG. 3 shows a close-up top perspective view of a vacuum frying device shown with an open cover.
Figure 4:
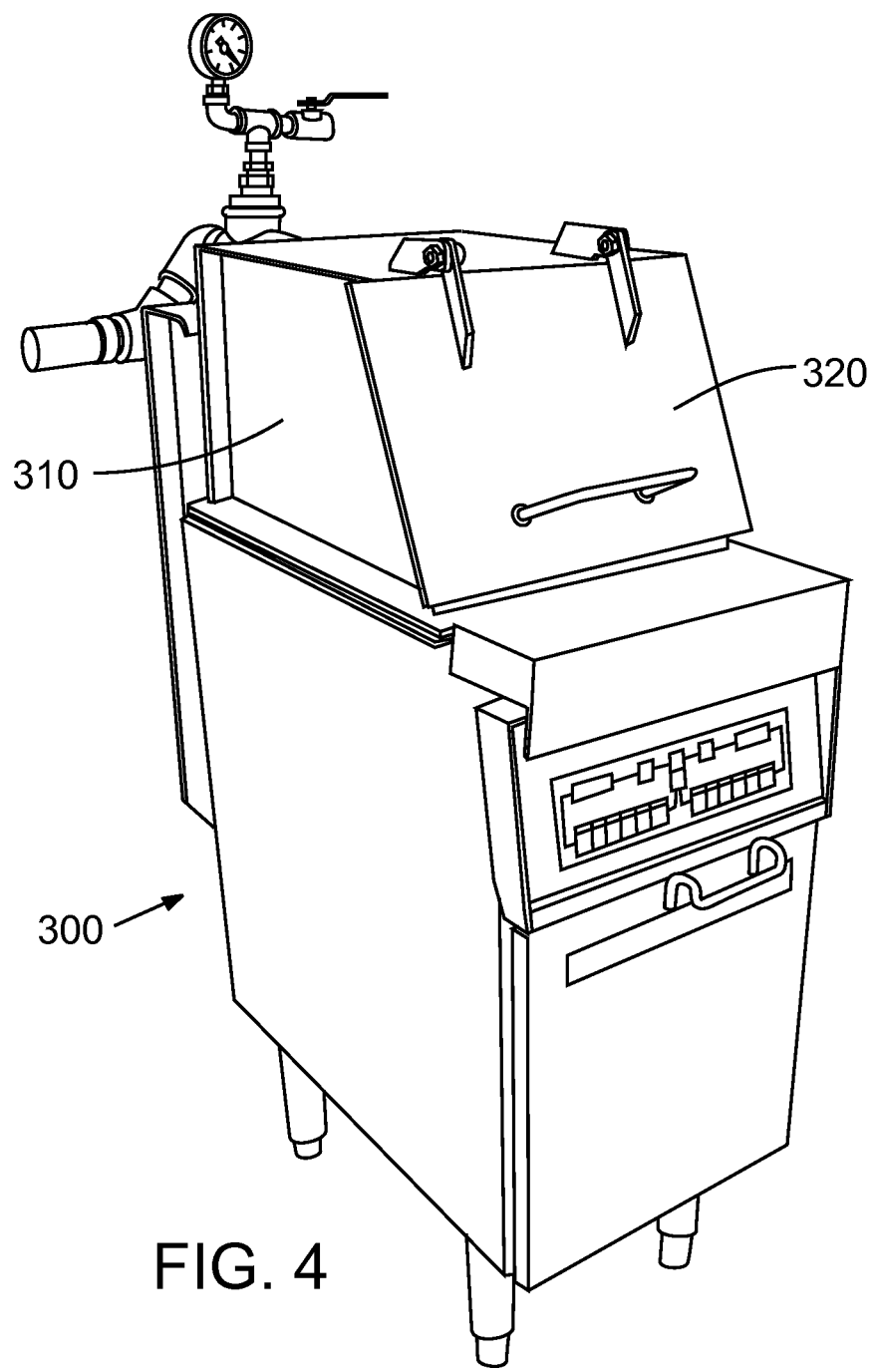
FIG. 4 shows a left side perspective view of a vacuum frying device.

Referring to FIGS. 1-3, a basket receiving area 110, defined by a hood 115, is located above an oil receiving area 120. Hood 115 can comprise four connected walls with an opening at the top and bottom. The opening at the top of the hood 115 provides a user with access to the basket receiving area 110. A cover or door 125 is provided to close the opening at the top of the hood 115 during a frying operation. The opening at the bottom of the hood 115 permits food articles to be moved from a first position above the oil receiving area 120 to a second position within the oil receiving area 120. Although the cover 125 in FIGS. 1-3 is shown covering an opening at the top of the hood 115, it should be understood that the cover may alternatively be positioned to cover an opening at a front side of the hood, as shown in FIG. 4 (see door 320).

The oil receiving area 120 can comprise a container (or vat) for holding oil for frying a food article. The Henny Penny® Pressure Fryer 500 was modified (retrofitted) by positioning a tube or pipe 155 (shown in FIG. 3) at or through an opening in the hood 115. The tube 155 is coupled to a vacuum device (as discussed in more detail below) so that air can be evacuated from the basket receiving area 110 and the oil receiving area 120 to create a lower pressure inside the frying device 100.

Referring to FIG. 2, two vacuum frying devices (both of which are modified Henny Penny® pressure fryers) are positioned side by side. The vacuum frying device 100 on the right is shown with the cover 125 in an open position. The open cover 125 shows a basket 130 held in a raised position within the basket receiving area 110. The basket 130 preferably has an open wire frame configuration; however, the basket 130 can be any type of container with one or more porous openings that allow oil to drain from the basket 130 when the basket 130 is raised out of the cooking oil.

As shown in FIGS. 2 and 3, two pairs of arms 140 are provided to lower and raise the basket 130 to and from the oil receiving area 120. Basket 130 is preferably removable from the arms 140, so that basket 130 can be completely removed from the frying device 100 to facilitate the addition of uncooked food articles to the basket 130 before frying and to facilitate the removal of cooked food articles from the basket 130 after frying.

FIG. 2 shows the basket 130 in a raised position. In the raised position, the basket 130 is held by the arms 140 above the oil receiving area 120, so that food articles (not shown) in the basket 130 are not exposed to oil (not shown) held in the oil receiving area 120. FIG. 3 shows the basket 130 in a lowered position. In the lowered position, the basket 130 is held by the arms so that the basket 130 (and any food articles contained in the basket 130) are positioned within the oil receiving area and exposed to any oil contained therein.

A mechanism (not shown) for raising and lowering the basket 130 by moving the arms 140 is provided and is preferably accessible outside of the frying device 100. As discussed in more detail below with reference to FIG. 9, such a mechanism is preferably positioned on the outside of the frying device so that when the door or cover is closed and a vacuum is applied to the frying device, the basket can be lowered into the oil and, after cooking, the basket can be raised back out of the oil before the vacuum is removed and the door or cover is opened.

A vacuum device 150 is coupled to the tube 155 so that a vacuum can be drawn inside the frying device 100. As shown in FIG. 3, the connecting tube 155 preferably extends through an opening in the hood 115 adjacent the basket receiving area 110 and far enough from the oil receiving area 120 so that the vacuum device 150 does not suck in oil from the oil receiving area 120 during operation. A pressure measuring device 160 (e.g., a vacuum gauge) can be provided to measure the pressure on the inside of the frying device.

As shown in FIG. 3, a seal 170 can be positioned between the cover 125 and an upper edge 180 of the vacuum frying device 100. In the embodiment shown in FIG. 3, seal 170 is positioned on a lower surface of cover 125; however, it should be understood that the seal could also be positioned on the upper edge 180 of the frying device 100. When the cover 125 is closed, the oil receiving area 120 and basket receiving area 110 are substantially sealed off from the outside environment.

In a frying process, oil is placed into the oil receiving area 120 of the frying device 100 and the oil is heated to a desired temperature. Because of the vacuum in the frying device 100, the oil can cook the food articles at a much lower temperature. The oil used in a conventional (atmospheric) frying process is heated to between about 335 and 370 degrees Fahrenheit. Depending on the vacuum applied and the desired cooking time, the oil temperature used with the frying device 100 can range between about 250 and 335 degrees Fahrenheit, and more preferably between about 290 and 310 degrees Fahrenheit. Under the same pressure conditions, an increase in the temperature of the oil will generally provide faster frying times, which results in shorter frying cycles. Similarly, under the same temperature conditions, a decrease in the pressure within the frying area (e.g., the basket receiving area and the oil receiving area) generally provides faster frying times.

Food articles, such as French fries, can be placed in the basket 130 while the basket 130 is in the raised position above the oil receiving area 120. Alternatively, the basket 130 can be removed from the frying device, loaded with food articles, and then coupled to the arms 140 within the basket receiving area 110.

The food articles cooked by the vacuum frying devices described herein can include any type of food product that can be fried, such as, for example, potato products (e.g., French fries), onion products (e.g., onion rings), and other batter-coated food items (e.g., cheese sticks).

After food articles are placed in the basket 130 and the basket 130 is in position within the basket receiving area 110, the cover 125 can be closed to seal the basket receiving area 110 and oil receiving area 120 from the outside environment. The vacuum device 150 can then be operated to remove air from inside the frying device until a desired internal pressure is reached. The reduction in air pressure inside the frying device 100 causes the cover 125 and seal 170 to close tightly against an upper edge 180 of the vacuum frying device, further sealing the oil receiving area 120 and basket receiving area 110 from the outside environment. As the vacuum device further reduces the pressure within the frying device, the seal strength between the cover 125 and upper edge 180 increases even further. The frying device can be operated at various pressures, however, a vacuum of between about 14 inches Hg and 28 inches Hg (full vacuum) is preferably applied, and more preferably between about 26 inches Hg and 28 inches Hg.

After the pressure in the device is decreased to the desired pressure, the basket 120 can be lowered into heated oil contained in the oil receiving area 120. In addition to reducing the frying temperature of the oil, vacuum frying device 100 can also fully cook the food article (e.g., French fries) in a shorter time than is possible with a conventional fryer. For example, using a conventional fryer with oil heated to 335 degrees Fahrenheit, a desired frying time for French fries may be about 3 minutes and 10 seconds. However, with an oil temperature of about 300 degrees Fahrenheit, French fries can be cooked using vacuum frying device 100 in about 2 minutes and 5 seconds. Of course, the type of food article that is being cooked will ultimately determine how long the food article will need to be cooked; however, cooking temperatures and/or residence time in the fryer can be reduced significantly using the vacuum frying device 100.

After maintaining the food articles in the heated oil for the desired residence time, the basket 130 (and food articles) can be raised out of the heated oil. The raising and lowering of the basket 130 can be achieved by using the external raising and lowering mechanism (as discussed above or as shown in FIG. 9).

Once the basket 130 is raised out of the oil, the basket 130 is desirably held out of the oil, with the vacuum being maintained, for a designated amount of time to allow for oil to drip or fall off of the food articles. If desirable, a mechanism for shaking or moving the basket 130 can be provided, so that, while the vacuum is maintained, excess oil can be removed from the food articles by shaking or otherwise agitating the food articles. When the vacuum is released, anything on the surface of the food articles will generally be absorbed into the food article. Accordingly, it may be desirable to spray flavoring on the food articles or otherwise season the food articles prior to removing the vacuum.

After performing any desired shaking or agitation step, waiting the designated amount of time, and/or adding any desired flavors or seasonings, the vacuum can be released and the basket 130 and food articles can be removed from the frying device 100.

Referring to FIG. 1, the frying device 100 is shown with spindle lock 190 at the top of the basket receiving area 110 and a latch 200. The spindle lock 190 and latch 200 are provided to latch and lock the cover 125 closed. While these devices are obviously necessary on a pressure fryer they are less necessary on a vacuum fryer. In particular, pressure fryers operate by increasing the pressure within the pressure fryer. As a result, a tremendous amount of pressure is exerted outwardly against the cover 125. Without the spindle lock and latch systems, the cover 125 would be forced open. In contrast, however, a vacuum fryer operates by decreasing the pressure within the vacuum fryer. Therefore, the cover 125 is pulled inward when the frying device 100 is operating and there is less need for a locking or latching mechanism than with a pressure frying device. In fact, shortly after the vacuum device begins reducing the pressure within the frying device, the cover 125 is sealed tightly enough that it cannot be opened easily (or at all) by a user until the vacuum is released.

Vacuum frying device 100 can also be safer to operate than a pressure fryer. If the seal were to fail on a pressure fryer, hot air and oil would likely be forced out of the pressure fryer through the leak or breach at a high rate of speed. However, if a seal were to fail on vacuum frying device 100, air would flow from outside the frying device 100 into the basket receiving area 110 or the oil receiving area 120. Thus, the breach would cause the vacuum to be reduced, but it would not cause a potentially dangerous expulsion of hot air or fluid from the frying device 100.

The reduced cooking temperatures can help to extend the operating life of oils used to fry food articles. Cooking oils can degrade relatively quickly under high heat and the reduction in temperatures afforded by vacuum frying reduces the speed in which the cooking oils will degrade. This is particularly helpful when cooking with oils that do not contain trans fats, since those oils tend to degrade even more quickly at higher temperatures.

The lower frying temperatures provide other significant advantages as well. Lower temperature frying makes it easier to maintain the natural colors and flavors of the cooked product. Also, the reduction in frying temperature can also measurably reduce the occurrence of a Maillard reaction, which involves reducing sugars and amino acids in the cooked product.

FIG. 4 shows an embodiment in which a conventional frying device is modified (retrofitted) for use as a vacuum frying device. The discussions of the embodiments and methods described with regard to FIGS. 1-3 are applicable to the embodiments described with regards to FIGS. 4-9, unless specifically stated or otherwise inapplicable because of the differences in their respective structures. For example, the methods of vacuum frying discussed above, including the residence times, oil temperatures, etc., also apply to the description set forth below.

Vacuum frying device 300 is a Frymaster® conventional frying device that has been modified to function as a vacuum frying device. The conventional open pot device was modified to have a hood 310 with a door 320. Hood 310 covers the oil receiving area 330 and the basket receiving area 340. Hood 310 can comprise a metal structure that effectively encloses the open pot of a conventional frying device. Hood 310 preferably comprises a door 320 that can be opened to provide access to the oil receiving area 330 and the basket receiving area 340. The door 320 can be positioned anywhere on the hood 310 (e.g., the door could be on the top surface of the hood or on any side surface); however, it is preferably on the front side of the hood 310 as shown in FIG. 5.

Figure 5:
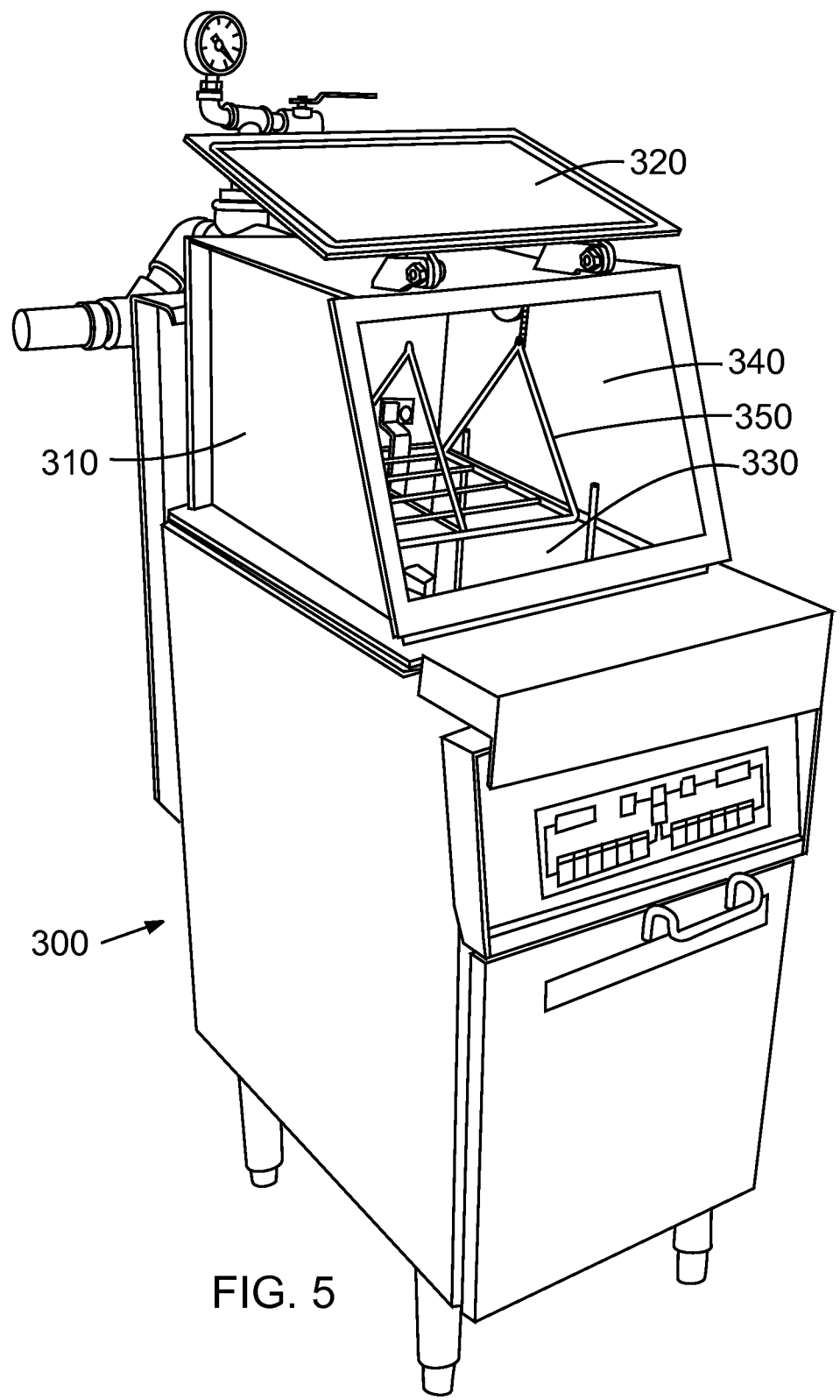
FIG. 5 shows a left side perspective view of a vacuum frying device with an open cover or door.

The front side of the hood 310 is also preferably angled, as shown in FIG. 5, so that a lower portion of the hood 310 extends further outward than an upper portion of the hood 310. This angled configuration provides better access to the basket receiving area 340. In addition, the angled front makes it easier to close the door 320, since the door 320 will remain shut when in the closed position because of gravity. Because the door is angled shut and because the vacuum will seal the door tightly during the vacuum frying operation, it may not be necessary to provide a latch or other such closure device.

The hood 310 can have an opening 345 (FIG. 8) that is configured to receive or connect to a vacuum device. The vacuum device is coupled directly or indirectly to this opening so that air can be evacuated from the basket receiving area 340 and the oil receiving area 330 to create a lower pressure inside the frying device 300.

Conventional frying devices are generally not built to handle the stresses associated with a vacuum frying process. Accordingly, when converting a convention frying device (such as the Frymaster® device) to a vacuum frying device, the container or vat that defines the oil receiving area 330 can be replaced with a container or vat constructed of thicker or stronger materials. Alternatively, the existing vat can be strengthened by the addition of strengtheners or other supports to the existing vat.

Figure 6:
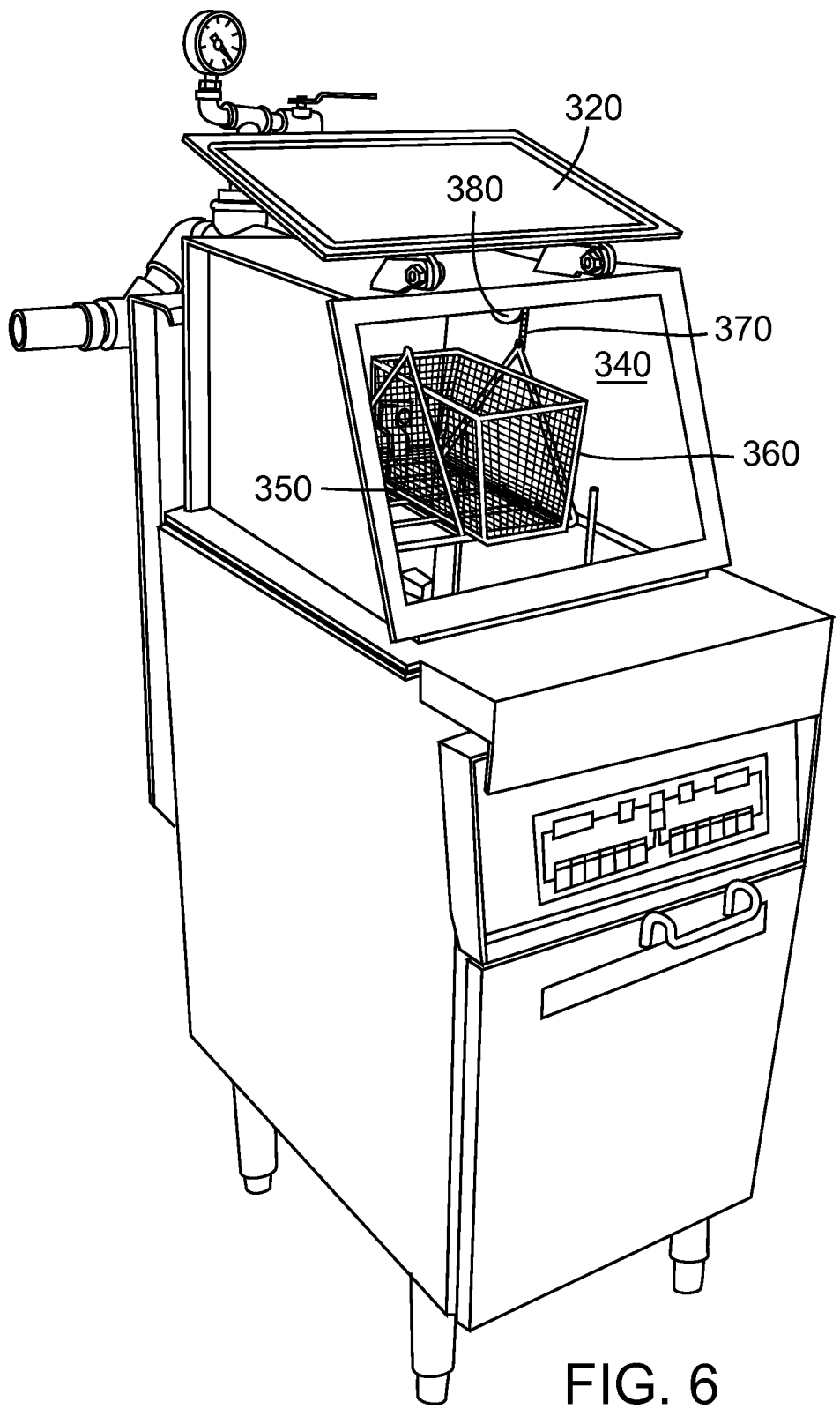
FIG. 6 shows a left side perspective view of a vacuum frying device with a basket held in a basket receiving area.
Figure 7:
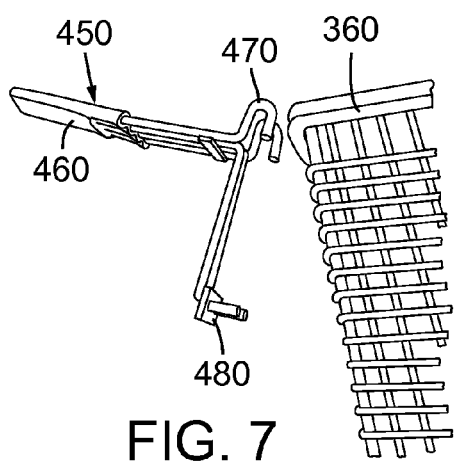
FIG. 7 shows a removable grasping mechanism for gripping a basket.
Figure 8:
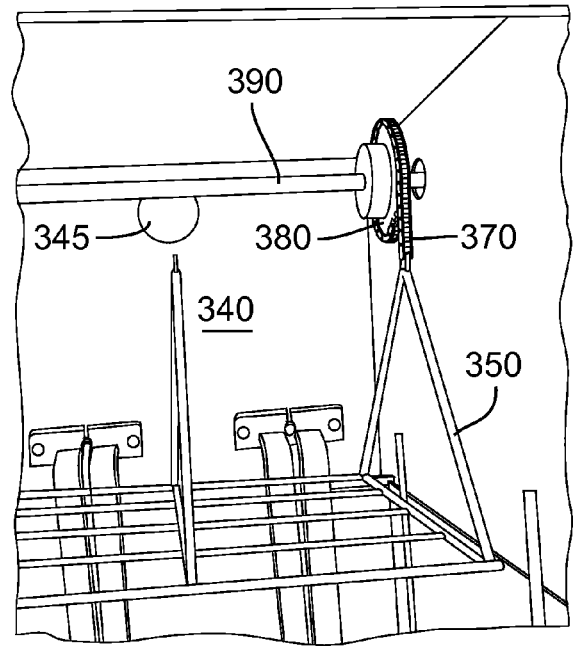
FIG. 8 shows a close up view of a mechanism for raising and lowering a basket receiving device out of and into an oil receiving area.

As shown in FIG. 6, a basket holding device 350 can be configured to receive a basket 360. The basket holding device 350 can be moveable from a first position above the oil receiving area (as shown in FIG. 6) to a second position within the oil receiving area. In one embodiment, a chain 370 can be connected to the basket holding device 350 to raise or lower the basket holding device 350. Referring to FIG. 8, one or more the chains 370 can be connected to one or more sprockets 380, which, in turn, are connected to a rod 390. Preferably, at least two sprockets and chain members are spaced apart from one another along the rod 390 to maintain the basket holding device 350 level during lowering and raising into and out of the oil. Rod 390 can be connected to a mechanism 400 (shown in FIG. 9) accessible to the outside of the frying device 300, which can be moved (e.g., rotated) to cause the rod 390 to turn, thereby raising or lowering the basket holding device 350.

Figure 9:
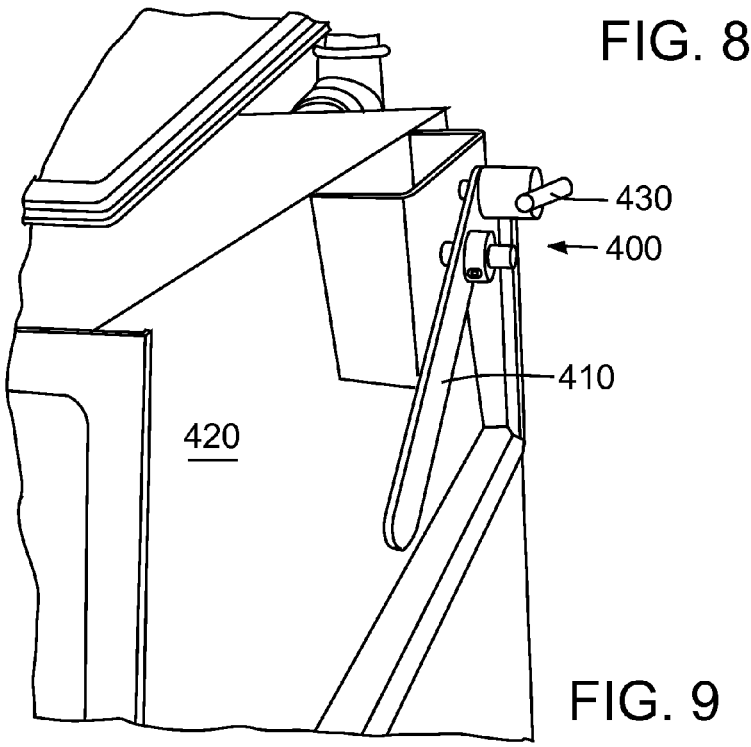
FIG. 9 shows a close up view of a mechanism for raising and lowering a basket receiving device out of and into an oil receiving area.

As shown in FIG. 9, mechanism 400 can be, for example, a lever 410 that is pivotably mounted to a side 420 of the frying device 300. A pin 430 can be coupled to the lever 410 to releaseably secure the lever 410 in one or more positions. Thus, pin 430 can be used to secure the lever 410 in a position that will hold the basket holding device 350 in a first position, such that the basket can be held outside of the oil in the oil receiving area 330. In addition, if desired, the pin can be used to secure the lever 410 in a position that secures the basket holding device 350 in other positions, such as in a second position where a basket held by the basket holding device 350 would be in oil held by the oil receiving area. Alternatively, a second position can be achieved by simply releasing the pin. That is, the length of the chain can be such that when the basket holding device 350 is in its lowest position with the chain fully extended from the rod 390, the basket holding device 350 is positioned within in the oil for cooking (i.e., the second position).

Preferably, a removable grasping mechanism 450 is provided to remove a basket 360 from within the frying device 300. The removable grasping mechanism 450 is configured to grasp a basket 360 so that the basket 360 can be removed from within the frying device 300. Because the mechanism 450 is removable from the basket 360, the mechanism 450 can remain outside of the frying device while the food articles are cooking in the basket 360. Then, after the food articles are cooked, the grasping mechanism 450 can be coupled to the basket 360 to remove the basket from the frying device 300 (i.e., from the basket receiving area 340).

Grasping mechanism 450 can have a variety of configurations. In the embodiment shown in FIG. 7, the grasping mechanism 450 comprises a handle portion 460, an upper hook portion 470, and a lower gripping portion 480. Handle portion 460 preferably has a contoured grip to aid in holding the grasping mechanism 450. In order to engage the grasping mechanism 450 with the basket 360, the upper hook portion 470 can be positioned over a top portion of the basket 360 and then pivoted (rotated) so that the lower gripping portion extends between a lower portion of the wire frame of the basket 360. It should be understood that other releasable grasping mechanisms could be used to grip and move a basket to and from the frying device 300.

In addition to the hand-held grasping mechanism described above, other mechanical or electro-mechanical structures can be used to remove the basket from the basket receiving area. For example, a computer-controlled grasping mechanism can be provided to remove the basket from the basket receiving area or to move the basket back into the basket receiving area.

As described above, a conventional frying device can be converted to a vacuum frying device by adding a hood 310 and a strengthened oil receiving area 330 (e.g., vat). Hood 310 is also preferably removable. As shown in FIG. 5, hood 310 can be configured to rest on a top surface of a conventional frying device (e.g., a Frymaster® conventional frying device). Various securing mechanisms can be used to removably secure the hood 310 to the top surface, including, for example, rails, clips, screws, and bolts. Preferably, a seal or gasket is positioned between the hood and the top surface to reduce or eliminate leaks between the hood and the top surface of the frying device. The removability of the hood provides flexibility for a user. For example, if a failure resulted in the vacuum device such that it is not possible to vacuum fry food articles, a user can simply remove the hood and use the device as a conventional (atmospheric) fryer.

Alternatively, the hood need not be removed in order to use the device as a conventional atmospheric fryer. Instead, the cover or door can be opened to provide access to the basket receiving area. The door can be left open during the frying process, or the door can be shut and the vacuum device turned off or otherwise inactivated.

If, upon conversion of the vacuum frying device to an atmospheric frying device by removing the hood or opening the door, the temperature of the oil in the vacuum frying device is lower than desired for cooking at atmospheric conditions, the temperature of the oil can be adjusted (e.g., increased) as necessary to provide an appropriate temperature for cooking food product.

Various vacuum devices could be used with the frying devices discussed above. Preferably, the vacuum devices used are capable of reducing the internal pressures relatively quickly so that the processing times for the food articles can be decreased. In addition, it should be understood that various methods can be used to release the vacuums. For example, another opening could be made in the hood and a valve could be provided in that opening to release the vacuum. Alternatively, a bypass valve could be provided on the vacuum device tube itself, eliminating the need for another opening into the hood.

Furthermore, the processes described above can be fully automated. For example, the frying device could be configured so that after food articles are placed in the basket and the door of the frying device is closed, the user need only press a single button to initiate the frying process. The automated process can include, for example, operating the vacuum device to draw a vacuum within the frying device, lowering the basket into the oil, frying the food articles for a predetermined amount of time, raising the basket out of the oil, waiting a predetermined amount of time (and/or shaking or otherwise agitating the food articles), and releasing the vacuum. Once the vacuum is released, the user can open the door and remove the cooked food articles.

The vacuum frying devices described above herein are configured to produce relatively small batches of fried product upon order in, for example, restaurants. Such on-demand production preferably is met by vacuum frying devices that are configured with oil receiving areas that are less than about 60 lbs. of oil capacity, and more preferably less than about 50 lbs. of oil capacity, and even more preferably between about 30 and 40 lbs. oil capacity.

The size of the frying area of the vacuum frying devices described herein is also preferably selected to produce relatively small batches of fried products. Thus, the frying area of the vacuum frying devices is preferably less than about 400 square inches. The smaller frying area permits the device to fit conveniently into a tight space, such as is often necessary in operations where food is made to order (e.g., restaurants).

By providing a vacuum frying device sized as described above (e.g., oil capacity and/or size of device), the vacuum frying devices can efficiently cook food articles for immediate service to an ordering customer. Moreover, since the energy required to pull a vacuum on the frying area is determined based on the size and/or capacity of the frying area in the vacuum frying device, such limitations on size and capacity provide a more efficient system for use in made-to-order applications, such as is required with restaurant cooking of fried food products.

The vacuum frying devices described herein also can be advantageous in that they can eliminate the need for an exhaust device, such as an exhaust hood. The vacuum device removes air from within the frying area, including water vapor, fumes, etc. that would normally need to be vented through an exhaust hood. In addition, the vacuum device can reduce odors associated with cooking fried articles. Specifically, vacuum devices pull air, including odorous fumes, from the frying area. During the air removal process, the air and fumes are compressed into a water mixture that can be discharged from the vacuum device. The water mixture that is discharged is substantially odor-free compared to fumes and vapor associated with a conventional atmospheric fryer. The elimination or reduction of odors associated with a frying process is particularly advantageous when frying product in close physical proximity to ordering customers, such as is required when frying food products to order in a restaurant.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A frying device comprising:
  a hood defining a basket receiving area and having an opening, wherein the hood is configured to receive a tube connected to a vacuum device, the tube being in fluid connection with the basket receiving area, wherein the vacuum device is configured to reduce the air pressure in the basket receiving area;
  a vacuum measuring device configured to measure the vacuum in the basket receiving area;
  an oil receiving area located below the basket receiving area;
  a door configured to be movable between a first position not covering the opening in the hood and a second position covering the opening in the hood, wherein the frying device is operable as an atmospheric frying device when the door is in the first position;
  a seal positioned between the door and the hood;
  a basket;
  a mechanism configured to move the basket from the basket receiving area to the oil receiving area;
  at least one arm member or at least one chain member in operative communication with the mechanism configured to selectively move the basket between the basket receiving area and the oil receiving area, wherein the at least one arm member or the at least one chain member are positioned within the area defined by the basket receiving area and the oil receiving area when the door is in the second position covering the opening in the hood.

2. The frying device of claim 1, wherein the mechanism for moving the basket comprises two sprockets attached to a rod, wherein the at least one chain member is coupled to the sprockets.

3. The frying device of claim 2, wherein the mechanism further comprises a lever located on an external surface of the frying device, the lever being configured to rotate the two sprockets.

4. The frying device of claim 1, wherein the hood can be removed to operate the frying device at atmospheric frying conditions.

5. The frying device of claim 1, wherein the oil receiving area is defined by a metal container that is capable of withstanding a vacuum of at least 28 inches of Hg.

6. A system for converting an atmospheric frying device to a vacuum frying device, the system comprising:
   a hood with front and bottom sides, the hood having an opening in the front side and an opening in the bottom side, the hood further comprising a door that is movable between a first position where the door does not cover the opening in the front of the hood and a second position where the door covers the opening in the front of the hood, wherein the frying device is operable as an atmospheric frying device when the door is in the first position, wherein the area formed by the hood defines a basket receiving area and the hood is configured to be received on a top surface of the atmospheric frying device with the opening on the bottom facing an oil receiving area of the atmosphere frying device, wherein the hood is configured to receive a tube connected to a vacuum device, the tube being in fluid connection with the basket receiving area, wherein the vacuum device is configured to reduce the air pressure in the basket receiving area;
   a vacuum measuring device configured to measure the vacuum in the basket receiving area;
   a seal positioned between the door and the hood;
   a basket;
   a mechanism configured to selectively move the basket from the basket receiving area to the oil receiving area;
   at least one chain member in operative communication with the mechanism configured for selectively moving the basket between the basket receiving area and the oil receiving area, wherein the at least one chain member is positioned within the area defined by the basket receiving area and the oil receiving area when the door is in the second position covering the opening in the hood.

7. The system of claim 6, further comprising a seal positioned on the bottom side of the hood.

8. The system of claim 6, further comprising:
   a vat configured to withstand a vacuum of at least 28 inches of Hg, the vat being configured to replace an existing vat on the atmospheric frying device.

9. The system of claim 6, further comprising:
   a strengthening member configured to strengthen an existing vat on the atmospheric frying device so that the strengthened vat can withstand a vacuum of at least 28 inches of Hg.

10. The system of claim 6, wherein the mechanism for moving the basket comprises two sprockets attached to a rod, wherein the at least one chain member is coupled to the sprockets.

11. The system of claim 10, wherein the mechanism further comprises a lever located on an external surface of the frying device, the lever being configured to rotate the two sprockets.

* * * * *